United States Patent [19]
Warner et al.

[11] Patent Number: 5,564,272
[45] Date of Patent: Oct. 15, 1996

[54] SLOTTED HYBRID PRESSURE VESSEL

[75] Inventors: Mark J. Warner; Wayne E. Berndt, both of North Ogden; O. N. Thompson, Jr., Logan; Scott W. Lauritzen, Hyrum; Kevin W. Davis, Ogden, all of Utah

[73] Assignee: Thiokol Corporation, Ogden, Utah

[21] Appl. No.: 282,990

[22] Filed: Jul. 29, 1994

[51] Int. Cl.⁶ .................................................. F02K 9/00
[52] U.S. Cl. ............................. 60/223; 60/255; 220/89.2
[58] Field of Search ................................ 60/39.091, 223, 60/253, 255; 102/481, 374; 220/414, 89.2, DIG. 27

[56] References Cited

U.S. PATENT DOCUMENTS

| | | | |
|---|---|---|---|
| 2,724,672 | 11/1955 | Rubin | 154/82 |
| 3,497,928 | 3/1970 | Coen | 29/6.1 |
| 3,513,051 | 5/1970 | Lichfield | 156/242 |
| 3,962,506 | 6/1976 | Dunahoo | 428/158 |
| 3,967,996 | 7/1976 | Kamov et al. | 156/156 |
| 3,973,397 | 8/1976 | Chase et al. | 60/253 |
| 4,099,309 | 7/1978 | Bender | 29/2 |
| 4,123,307 | 10/1978 | Lemelson | 156/172 |
| 4,146,380 | 3/1979 | Caffarella et al. | 65/105 |
| 4,169,749 | 10/1979 | Clark | 156/156 |
| 4,221,032 | 9/1980 | Cousino et al. | 29/2 |
| 4,292,101 | 9/1981 | Reichert | 156/156 |
| 4,458,595 | 7/1984 | Gerrish, Jr. et al. | 102/290 |
| 4,565,595 | 1/1986 | Whitener | 156/156 |
| 4,682,003 | 7/1987 | Minakawa et al. | 219/121 LN |
| 4,795,560 | 1/1989 | Chupka et al. | 210/497.01 |
| 4,901,417 | 2/1990 | Chupka et al. | 29/163.8 |
| 4,931,615 | 6/1990 | Muncy et al. | 219/121.67 |
| 5,035,180 | 7/1991 | Purcell et al. | 102/481 |
| 5,044,154 | 9/1991 | English, Jr. et al. | 60/223 |
| 5,060,470 | 10/1991 | Vanname | 60/253 |
| 5,064,537 | 11/1991 | Chupka et al. | 210/497.01 |
| 5,228,285 | 7/1993 | Van Name et al. | 60/253 |
| 5,280,706 | 1/1994 | Yorgason | 60/255 |
| 5,285,592 | 2/1994 | Sides | 60/253 |
| 5,348,603 | 9/1994 | Yorgason | 156/191 |
| 5,363,645 | 11/1994 | Pellet | 60/267 |
| 5,392,596 | 2/1995 | Holsapple et al. | 60/753.2 |

FOREIGN PATENT DOCUMENTS 746214 3/1958 United Kingdom.

*Primary Examiner*—Timothy S. Thorpe
*Attorney, Agent, or Firm*—Madson & Metcalf; Ronald L. Lyons

[57] ABSTRACT

The present invention is directed to a novel pressure vessel and process for manufacturing the pressure vessel. In one embodiment, the invention includes a case for a rocket motor which includes a cylindrical, metal shell which has been configured with a plurality of slots positioned in axially extending rows. A fiber reinforced plastic layer is attached to the metal shell. Each slot has a length (L) and is separated by adjacent slots in the same row by an axial distance (A) with adjacent rows of slots separated by a circumferential distance (C) and configured such that $L+A \geq 6C$ and $L \geq 4A$. The method of the invention comprises using a $CO_2$ laser to cut a keyhole in the shell and then cutting axially outwardly from the keyhole to form the slot, resulting in slots having a width equal to the cutting width of the laser. The beam is then defocused and used to heat a portion of the metal shell surrounding the ends of each slot to produce a tempered zone.

34 Claims, 3 Drawing Sheets

SLOTTED HYBRID PRESSURE VESSEL

BACKGROUND

1. The Field of the Invention

The present invention is related to a hybrid composite/metal pressure vessel. More particularly, the present invention is related to a novel pressure vessel configuration capable of satisfying Insensitive Munitions requirements.

2. Technical Background

Historically, rocket motor cases have generally been made of metal. Metal cases have traditionally been favored because of their inherent toughness and versatility. A variety of end closures and fin attachments can be easily mounted to a metal case, making metal cases suitable for many applications. Also, metal cases can be quickly and inexpensively manufactured. Thus, metal cases have generally provided excellent performance and versatility at an acceptable cost.

However, metal cases have the potential of containing substantial internal pressure when hot or damaged. Thus, if a rocket motor having a metal case is inadvertently ignited, either through exposure to high temperatures or through bullet or fragment impact, the combustible propellant may react violently under the contained pressure. Ignition pressure may escape through the rocket nozzle, generating substantial thrust, propelling the burning rocket motor. Additionally, the propellant may explode, projecting fragments of the metal shell in many directions. The dangers to personnel and equipment resulting from the inadvertent ignition of rocket motors having a metal case are obvious.

As a result of these dangers, tests to determine the sensitivity of rocket motors to conditions which may cause unplanned ignition have been developed. Munitions successfully passing such tests are generally categorized as "Insensitive Munitions." Thus, Insensitive Munitions tests attempt to measure the sensitivity of a rocket motor to cookoff, and bullet and fragment impact.

In response to the desire for an improved rocket motor case which can satisfy Insensitive Munitions requirements, a variety of "hybrid" metal/composite rocket motor cases have been developed. Such hybrid cases include a metal shell and a composite layer which can be affixed either inside or outside the metal shell. The metal shell typically is designed to provide substantial axial strength while the composite layer provides the hoop strength.

When such hybrid cases are subjected to cookoff or fragment tests, the composite layer is destroyed. Because the metal shell is incapable of supporting the hoop loads imposed as a result of the combustion pressure of the propellant, the shell will also fail, thereby eliminating the ability of the case to contain pressure, permitting the propellant to burn mildly. By reducing the pressure containment capability of the case, the violence with which the propellant may combust is reduced.

One proposed hybrid case design involves configuring small slots in the metal shell which will propagate when subjected to a predetermined pressure. The size of these slots is determined by calculating the "critical flaw size" of the metal shell at a given pressure. The slots which are configured in the metal shell are sized to be equal to the critical flaw size for a predetermined pressure.

Consequently, when the motor is subjected to an Insensitive Munitions event which ignites the propellant and causes the composite layer to fail, the full combustion pressure is imposed upon the metal shell. The slots in the metal shell, being of critical length for that pressure, immediately propagate.

One disadvantage with this design is that a substantial pressure may be required to induce propagation of the slots in the metal shell. Many propellants will react quite violently under minimal pressure containment. Indeed, the pressures required to generate propagation in slotted hybrid pressure vessels may be sufficiently high that unacceptably violent rupture occurs.

Another difficulty associated with the slotted hybrid pressure vessels arises when the metal shell is made of a high-strength steel. Because of the low fracture toughness of high-strength steel, the critical flaw size is quite small. Configuring slots in a metal shell made of high-strength steel cannot be done with conventional manufacturing methods. Hence, it is extremely expensive, if not impossible, to implement high-strength steels in a hybrid pressure vessel.

A further disadvantage associated with the use of slotted hybrid pressure vessels is their inability to take advantage of the full load-bearing capabilities of the composite layer. As the load on the composite layer increases, the composite layer deforms proportionally in response to the load increase. Typical composites can be subjected to one to three percent strain before failing.

However, when attached to a metal shell, the hoop strain in the composite layer is limited to the strain of the metal shell. As strain increases in the composite layer, the load is transferred through the bond to the metal shell. If sufficient hoop load is transferred to the metal shell, the slots in the shell could propagate, thereby destroying the metal shell's ability to bear axial load. Thus, the hybrid pressure vessel must be designed so that the maximum internal pressure will not cause the composite layer to strain significantly beyond the capability of the metal shell.

From the foregoing, it will be appreciated that it would be an advancement in the art to provide an improved hybrid pressure vessel design which significantly reduces or eliminates the pressure containment capability of the metal shell when subjected to an Insensitive Munitions event.

It would be a further advancement in the art to provide a hybrid pressure vessel design which employs a metal shell made of high-strength steel.

It would be an additional advancement in the art if such a design would permit the composite layer to strain beyond the yield point of the metal case without destroying the axial strength of the metal case.

Such a hybrid pressure vessel and method for manufacturing is disclosed and claimed herein.

BRIEF SUMMARY AND OBJECTS OF THE INVENTION

The present invention is directed to a novel pressure vessel and process for manufacturing the pressure vessel. In a preferred embodiment, the invention includes a case for a rocket motor which includes a cylindrical, metal shell which has been configured with a plurality of slots positioned in axially extending rows. A fiber reinforced plastic layer is attached to the metal shell. The metal shell is preferably a thin-walled shell made of a high-strength steel.

Each slot has a length (L) and is separated from adjacent slots in the same row by an axial distance (A). Adjacent rows of slots are separated by a circumferential distance (C). The slots all have approximately the same length and width and are positioned in an overlapping pattern such that $L+A \geq 6C$ and $L \geqq 4A$. In a presently preferred embodiment, the slot pattern is configured such that $L+A \geqq 7C$ and $L \geqq 9A$.

The slots are preferably cut into the metal shell with a laser and have a width less than 0.1 inches, and preferably less than 0.06 inches. In a presently preferred embodiment, the width is about 0.005 inches.

A portion of the metal shell surrounding the ends of each slot is heated to produce a tempered zone. The tempered zone extends outwardly from the ends of each slot a distance of approximately five percent of the circumferential distance (C).

Fins may be attached to the rocket motor case by welding fin clips to the metal shell.

The fiber reinforced plastic, or composite, layer may be attached to either the inside or the outside of the metal shell. The composite material may include either a thermoset or a thermoplastic resin. In one embodiment, sheets of unidirectional fiber reinforcement bonded together by a thermoplastic resin are rolled to form a composite liner which is attached to the inside of the metal shell.

The pressure vessel of the present invention is manufactured by using a $CO_2$ laser to cut the slots into the metal shell. The slots are formed by initially cutting through the shell at a location corresponding to a center portion of a slot to form a keyhole. The laser is then moved axially outwardly from the keyhole to form the slot. Thus, the slots have a width substantially equivalent to the cutting width of the laser.

While cutting the slots, a blocking material may be inserted within the metal shell to block the portion of the cutting beam which penetrates the metal shell, thereby preventing the beam from contacting any other portion of the metal shell.

After a slot is formed in the shell by the laser, a tempered zone is formed in the metal shell around the ends of each slot. The tempered zone is formed by using the defocused laser beam to heat the metal surrounding the ends of each slot for a predetermined period of time.

After formation of the slots in the metal shell, the composite layer is attached to the shell according to any of those attachment methods known in the art.

Thus, it is an object of the present invention to provide an improved hybrid pressure vessel which significantly reduces or eliminates the pressure containment capability of the metal shell when subjected to an Insensitive Munitions event.

It is a further object of the present invention to provide such a hybrid pressure vessel which could employ a metal shell made of high-strength steel.

It is an additional object of the present invention to provide such a pressure vessel which permits the composite layer to strain in the hoop direction without destroying the axial strength of the metal case.

These and other objects and advantages of the present invention will become more fully apparent by examination of the following description of the preferred embodiments and the accompanying drawings.

BRIEF DESCRIPTION OF THE DRAWINGS

A more particular description of the invention briefly described above will be rendered by reference to the appended drawings. Understanding that these drawings only provide information concerning typical embodiments of the invention and are not therefore to be considered limiting of its scope, the invention will be described and explained with additional specificity and detail through the use of the accompanying drawings, in which.

DETAILED DESCRIPTION OF THE PREFERRED EMBODIMENTS

Figure 1:
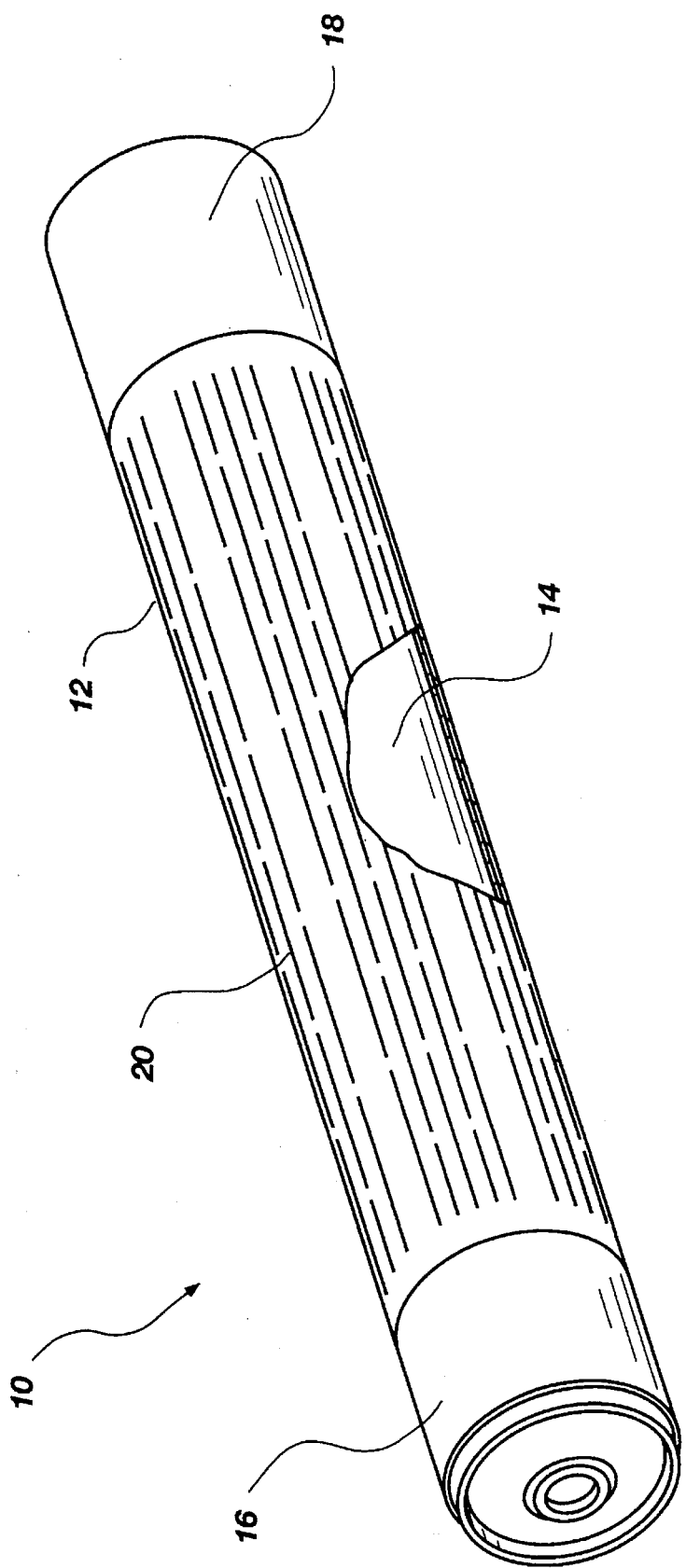
FIG. 1 is a perspective view of one embodiment of a rocket motor case built in accordance with the teachings of the present invention.

Reference is now made to the figures wherein like parts are referred to by like numerals throughout. With particular reference to FIG. 1, a rocket motor case according to the present invention is generally designated at 10. Although the apparatus and process of the present invention are described in connection with a case for a rocket motor, it should be appreciated that the present invention may be successfully employed in connection with any pressure vessel which must satisfy Insensitive Munitions requirements. Thus, one of skill in the art will appreciate that the present invention may be incorporated in a variety of different applications. One such alternative application is a pressure vessel for containment of internal flammable materials.

In this preferred embodiment, the case 10 includes a cylinder (metal shell 12 and a fiber reinforced plastic liner 14), a forward dome 16, and an aft section 18. Attachment of the forward dome 16 and the aft section 18 to the case cylinder may be accomplished by any of those attachment methods known to those of skill in the art. Such methods include, for example, electron beam welding.

In one presently preferred embodiment, the metal shell 12 is made of high-strength steel, such as 300M steel. The metal shell 12 has a diameter of 13.5 inches, a wall thickness of 0.07 where the slots are located and a length of about 70 inches. When loaded with propellant (not shown), the resulting rocket motor is suitable for use in tactical missiles.

In accordance with the teachings of the present invention, the metal shell 12 is configured with a plurality of slots 20 which extend in the axial direction. The specific configuration of the slots 20 is illustrated in FIG. 2.

Figure 2:
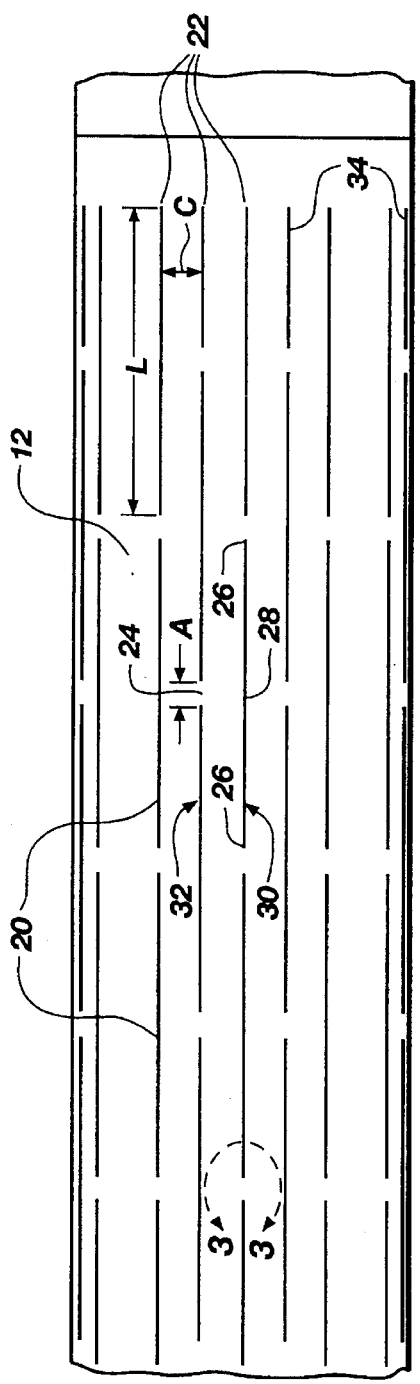
FIG. 2 is a side, plan view of the rocket motor case of FIG. 1.

With reference now to FIG. 2, the shell 12 is configured with a plurality of slots positioned in axially extending rows 22. Each slot 20 has a length L and is separated from adjacent slots in the same row 22 by an axial space 24 having a length A. Adjacent rows 22 of slots are separated by a circumferential distance C.

The slots 20 are configured in the shell 12 such that there is substantial overlap of slots in adjacent rows 22. Each slot includes two ends 26 and a midpoint 28 half way between the ends 26. The axial space 24 between two slots 20 is positioned at approximately the same axial position as the midpoint 28 of a corresponding slot in an adjacent row 22. Thus, for a given first slot 30, at least a portion of a second slot 32 is located at the same axial position as a portion of the first slot 30.

The slots 20 are configured in the shell 12 such that the hoop stiffness of the metal shell is negligible. Thus, the pressure vessel of the present invention relies entirely upon the hoop strength of the composite material for bearing hoop loads. Hence, should an Insensitive Munitions event occur resulting in failure of the composite liner, the metal shell will not permit pressure containment.

The unique configuration of the slots 20 in the metal shell 12 destroy the hoop strength of the shell. The present invention is configured such that the length L of a given slot is substantially equal to or greater than 6C. More particularly, it is preferred that the slots be configured such that $L+A \geq 6C$ and $L \geq 4A$. In the presently preferred embodiment illustrated in FIG. 2, the slots are configured such that $L+A \geq 7C$ and $L \geq 9A$.

For the 13.5 inch diameter rocket motor case of FIG. 2, the slots 20 have a length of 12.2 inches, are separated by an axial distance A of about one inch, and are separated by a circumferential distance of about 1.8 inches. This configuration generally corresponds to a row 22 of slots located about every 15 degrees about the perimeter of the case.

While the width of the slots may vary according to the particular application for which the pressure vessel is intended, it is preferred that the slots be less than about 0.1 inches wide and preferably less than about 0.06 inches wide. In the presently preferred embodiment illustrated in FIG. 2, the slots are about 0.005 inches wide. If the width of the slots is greater than about 0.010 inches, consideration must be given to sealing the slots to prevent resin from extruding through the slots during manufacture of the pressure vessel. Of course, as the resin viscosity increases, the slot size which will require sealing also increases. This is preferably done by employing a material that will not add hoop strength to the case, such as silica filled NBR rubber.

With continued reference to FIG. 2, the slots 20 are preferably configured with the same length and width. As illustrated in the figure, the slots are positioned relative to each other to form a repeating pattern. Hence, the axial distance between all adjacent, collinear slots is substantially equal. One of skill in the art will appreciate, however, that at the ends of the pressure vessel, some slots must be truncated. Thus, a small number of truncated slots 34 are located at the ends of the pressure vessel.

Figure 3:
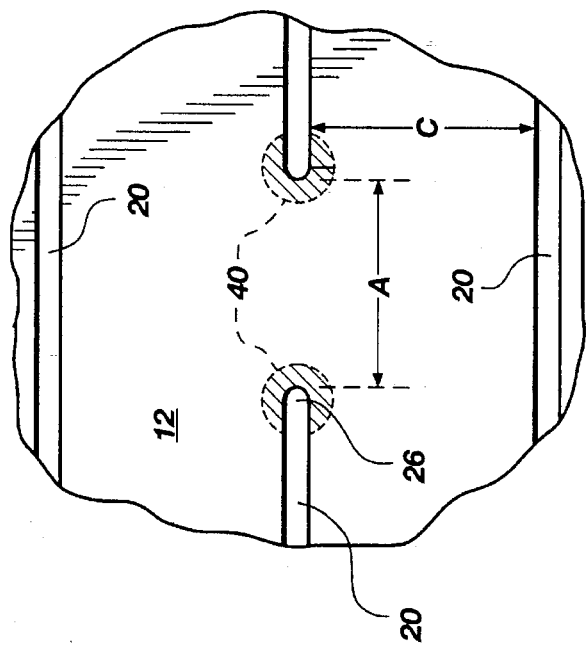
FIG. 3 is an enlarged view of a portion of the rocket motor case illustrated in FIG. 2.

When the metal shell 12 is made of a high-strength steel, each slot is preferably configured with a tempered zone, as illustrated in FIG. 3. As explained in greater detail below, the steel surrounding the ends 26 of each slot 20 is tempered by heating that portion of the metal. The tempered zone 40 preferably extends outwardly from each slot end 26 a distance of approximately five percent of the circumferential distance (C).

Tempering the metal surrounding the ends 26 of the slots improves the fracture toughness at those locations and consequently increases the critical flaw size. In one presently preferred rocket motor case made of 300M steel, the material between the slot ends 26 is in compression and does not need the full strength provided by the 300M material. In that embodiment, the steel in zone 40 is tempered to increase the fracture toughness in that region. As will be appreciated by one of skill in the art, if the metal shell is not fabricated of a high-strength steel, the shell may have sufficient fracture toughness that tempering the area around the ends of the slots is not necessary.

Figure 4:
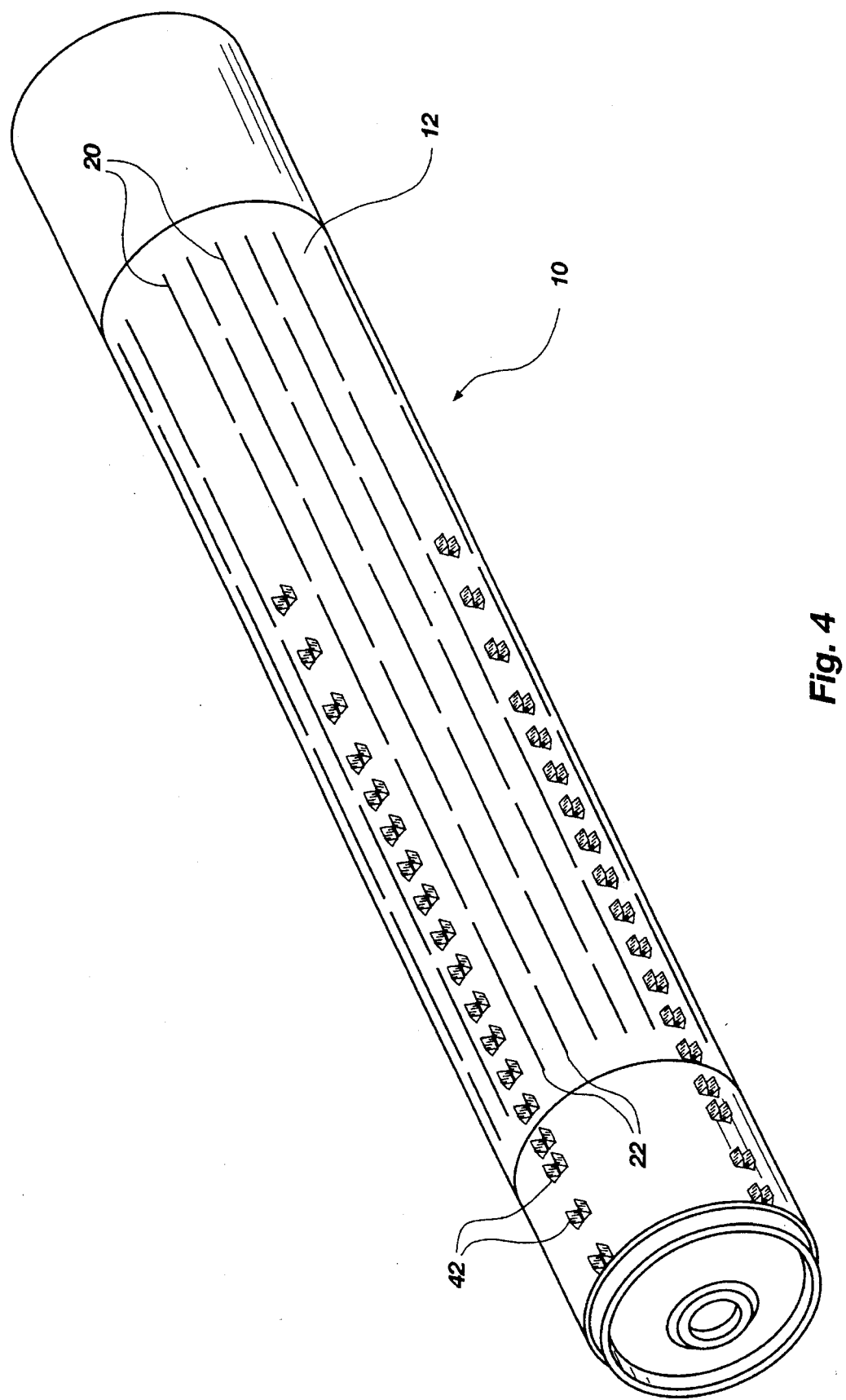
FIG. 4 is a partial perspective view of the rocket motor case of FIG. 1 with fin clips also illustrated.

Advantageously, when the composite liner is attached to the inside of the metal shell 12, attachments such as fins may readily be affixed to the shell by conventional methods. As illustrated in FIG. 4, fin clips 42 may be attached directly to the metal shell 12. The attachment of fin clips 42 is preferably accomplished by welding or other attachment means commonly known in the art. In this presently preferred embodiment, any rows of slots 20 which would correspond in location to the fin clips 42 are omitted. Hence, for a rocket motor case employing four fins with the slot configuration illustrated in FIG. 4, four rows 22 of slots are omitted to accommodate the attachment of fin clips 42 to the metal shell 12.

Referring again to FIG. 1, the fiber reinforced plastic liner 14 is attached to the inside of the metal shell 12. In alternative embodiments of the present invention, the composite liner 14 may be attached on the outside of the metal shell. For example, the composite liner 14 may comprise a resin impregnated filament winding wrapped about the metal shell. When it is desired to employ such a filament wound composite layer, the metal shell may act as a mandrel.

Of course, a variety of types of composite materials may be employed in accordance with the teachings of the present invention. For example, both thermoset and thermoplastic resins may be utilized. Unidirectional fiber reinforcement bonded together by a thermoplastic or a thermoset resin are typical of composite materials suitable for use according to the present invention.

The presently preferred composite liner 14 is formed by rolling sheets of composite material. The sheets are made of uncured fiber reinforced plastic and comprise unidirectional fiber reinforcement which has been pre-impregnated with an uncured thermoset or a thermoplastic resin. Such sheets are commercially available in long rolls and are commonly referred to as "fiber reinforced pre-preg tape" or "FRP tape." The sheets generally range in thickness from about 0.004 inches to about 0.020 inches. The fiber reinforcement within the sheets 14 may include any of those conventionally known in the art of composite materials, such as graphite, glass, or aramid.

The uncured resin utilized in the sheets may include any of those thermoset or thermoplastic resins suitable for use in composite, fiber-reinforced materials. Thermoset pre-preg epoxy resins marketed by Amoco Performance Products as "ERL-1908" and "934" and "974" pre-preg epoxy resins marketed by Fiberite, Corp. or thermoplastic resins, such as Nylon 12, are presently believed to be acceptable resins for use in accordance with the teachings of the present invention.

The composite liner 14 is bonded to the metal shell 12 by the use of a suitable bonding adhesive. An example of such a bonding adhesive is that sold under the trade name Chemlok. In one presently preferred embodiment of the invention, the composite-to-steel bond is established as the composite resin consolidates. The liner 14 is preferably bonded to the shell 12 by applying bonding adhesive such that a bond is created along the axial length of the shell only at locations corresponding to the rows of fin clips 42 (FIG. 4). Elsewhere, the composite is prevented from bonding to the case using a release agent such as that sold under the trade name Mold Whiz. Thus, four rows of bonding adhesive are utilized in this embodiment.

A hybrid pressure vessel is manufactured in accordance with the teachings of the present invention by initially obtaining a suitable metal shell 12. The metal shell may be made of a variety of types of metals capable of providing the axial loads required of the pressure vessel. One presently preferred type of metal for use in constructing a hybrid rocket motor case is 300M steel, a high-strength steel. Of course, depending on the particular application for which the pressure vessel is to be used, medium or low-strength steels may also be employed.

The wall thickness of the metal shell may also vary according to the particular application. The hybrid rocket motor case illustrated in FIG. 1 utilizes a metal shell 12 having a wall thickness of approximately 0.07 inches.

The slots are cut into the shell by using a laser. As will be appreciated by one of skill in the art, a variety of types of lasers may be employed for this purpose. A presently preferred laser is a standard $CO_2$ laser made by Laser Dyne. It is preferred that each slot is formed by a single, linear cut of the laser to produce slots having a width substantially equivalent to the cutting width of the laser. In this preferred method, the slots produced by the laser are approximately 0.005 inches wide.

The slots are cut into the metal shell by initially cutting through the shell at a location corresponding to a center portion of a slot to form a keyhole. Because the width of the keyhole is wider than the cutting width of the laser, it is preferred that the slot be cut to ensure that the keyhole is not located at the end of a slot. Thus, upon forming the keyhole, cutting proceeds axially outwardly to form the slot. When the slot is completely cut, the keyhole is preferably located approximately in the center of the slot. This cutting process is repeated to form all of the slots 20 in the metal shell 12 according to the a predetermined slot pattern, established as outlined above.

As the laser cuts the slots in the metal shell, the portion of the cutting beam which penetrates the metal shell during the cutting procedure may be blocked from contacting any other portion of the metal shell. This is accomplished by inserting a blocking material, such as copper or ceramic, within the metal shell. If the laser beam is not blocked, the heat generated on surfaces of the shell which are inadvertently contacted by the beam, may adversely affect the metallurgical properties of the shell at that location. For example, the shell may become tempered or embrittled at that location, thereby decreasing the strength or toughness of the metal at that point.

Referring now to FIG. 3, the metal surrounding the ends 26 of each slot 20 is preferably tempered in zone 40. This is accomplished by defocusing the laser beam and passing it in all orbital fashion around the ends 26 of the slot 20. The power setting and dwell time must be sufficient to temper the metal at that location. In the presently preferred method utilized in forming the tempered zones of the rocket motor case illustrated herein, a power of about 125 Watts and a dwell time of about 12 seconds have been found to be optimal. The precise size of the tempered zone 40 may, of course, vary according to the application. However, it is presently preferred that the tempered zone 40 extend outwardly from each slot end 26 a distance of approximately five percent of the circumferential distance (C).

Fins may be attached to the case by, for example, attaching fin clips to the case. Fin clips may be attached to the case by known attachment methods, such as gas tungsten arc welding.

Once the slots 20 have been formed in the metal shell 12, the shell may be attached to the composite liner 14. If the slots are wider than about 0.01 inches, it is preferable to first consider whether the slots should be filled with a filling material to prevent the composite from extruding through the slots and buckling the fibers.

Attachment of the composite liner 14 to the metal shell 12 may be accomplished according to any of those methods known in the art. It is presently preferred to utilize a rolled composite liner. The preferred method for attachment of the rolled composite liner is to initially overwrap the metal shell 12 with sheet metal caul plate or FEP film and dry aramid roving to provide pressure containment during consolidation of the composite.

The thermoplastic composite sheets which form the composite liner are then hand rolled and installed inside the metal shell 12. A silicone pressure bladder is then placed inside the shell and the associated pressure bladder tooling is assembled. Once the pressure bladder tooling is assembled and fastened to the metal shell, the case is placed in the curing oven and pressurized to 5.0 psi. The case is heated by ramping the oven temperature to 400 degrees Fahrenheit at a rate of five degrees Fahrenheit per minute. A thermocouple is utilized to monitor the case temperature. When the case temperature reaches 350 degrees Fahrenheit, the pressure is increased to 50 psi and held at that pressure for approximately 30 minutes. At the end of that 30 minute period, the case temperature will be 370° F.±10° F.

The case is then cooled, while maintaining the internal pressure at 50 psi, by circulating air over and around the case with a large fan. After the case temperature drops to at least 120 degrees Fahrenheit, the pressure is released and the pressure bladder assembly removed. Bonding of the composite to the metal shell occurs during this consolidation cycle.

It should be appreciated that the apparatus and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A hybrid pressure vessel, comprising:

a cylindrical, metal shell configured with a first axially positioned slot having a length (L) and a second axially positioned slot separated from the first slot by a circumferential distance (C), at least a portion of the second slot located at the same axial position as a portion of the first slot, the slots configured such that L>6C, wherein the width of each slot is less than about 0.06 inches; and a fiber reinforced plastic layer attached to the shell.

2. A hybrid pressure vessel as defined in claim 1, wherein at least two of the slots in the metal shell are collinearly positioned and separated by an axial distance (A) and wherein L+A≧6C and L≧4A.

3. A hybrid pressure vessel as defined in claim 1, wherein each of the slots in the metal shell have approximately the same length and width.

4. A hybrid pressure vessel as defined in claim 1, wherein the axial distance between all adjacent, collinear slots is substantially equal.

5. A hybrid pressure vessel as defined in claim 1, wherein the metal shell includes a plurality of slots positioned in axially extending rows, each row being separated from at least one adjacent row by the circumferential distance (C).

6. A hybrid pressure vessel as defined in claim 1, wherein the metal shell is made of a high-strength steel and each slot has two ends positioned in a tempered zone.

7. A hybrid pressure vessel as defined in claim 1, wherein the metal shell includes a plurality of slots positioned in axially extending rows, each slot having a midpoint, and wherein adjacent, collinear slots are separated by an axial space, the axial space positioned at approximately the same axial position as the midpoint of a corresponding slot in an adjacent row.

8. A hybrid pressure vessel as defined in claim 1, wherein the fiber reinforced plastic layer comprises a resin impregnated filament winding wrapped about the metal shell.

9. A hybrid pressure vessel as defined in claim 1, wherein the metal shell has an interior and wherein the fiber reinforced plastic layer is attached to the interior of the metal shell.

10. A hybrid pressure vessel as defined in claim 1, wherein the fiber reinforced plastic layer comprises a plurality of sheets of unidirectional fiber reinforcement bonded together by a thermoset resin.

11. A hybrid pressure vessel as defined in claim 1, wherein the fiber reinforced plastic layer comprises a plurality of sheets of unidirectional fiber reinforcement bonded together by a thermoplastic resin.

12. A case for a rocket motor, comprising:

a cylindrical, metal shell configured with a plurality of slots positioned in axially extending rows, each slot having a length (L) and a midpoint, wherein adjacent, collinear slots are separated by an axial space, the axial space having a length (A), the axial space positioned at approximately the same axial position as the midpoint of a corresponding slot in an adjacent row, and wherein each row of slots is separated from an adjacent row of slots by a circumferential distance (C), the slots configured such that $L+A \geq 6C$ and $L \geq 4A$, wherein the metal shell is made of a high-strength steel and each slot has two ends positioned in a tempered zone; and a fiber reinforced plastic layer attached to the shell.

13. A case for a rocket motor as defined in claim 12, wherein the slots are configured in the metal shell such that $L+A \geq 7C$ and $L \geq 9A$.

14. A case for a rocket motor as defined in claim 12, wherein each of the slots in the metal shell have approximately the same length and width.

15. A case for a rocket motor as defined in claim 12, wherein the axial distance between all adjacent, collinear slots is substantially equal.

16. A case for a rocket motor as defined in claim 13, wherein the tempered zone extends outwardly from each slot end a distance of approximately five percent of the circumferential distance (C).

17. A case for a rocket motor as defined in claim 12, wherein each slot has a width which is less than 0.1 inches.

18. A case for a rocket motor as defined in claim 17, wherein the width of each slot is less than about 0.06 inches.

19. A case for a rocket motor as defined in claim 18, wherein the width of each slot is about 0.005 inches.

20. A case for a rocket motor as defined in claim 12, wherein the fiber reinforced plastic layer comprises a resin impregnated filament winding wrapped about the metal shell.

21. A case for a rocket motor as defined in claim 12, wherein the metal shell has an interior and wherein the fiber reinforced plastic layer is attached to the interior of the metal shell.

22. A case for a rocket motor as defined in claim 12, wherein the fiber reinforced plastic layer comprises a plurality of sheets of unidirectional fiber reinforcement bonded together by a thermoset resin.

23. A case for a rocket motor as defined in claim 12, wherein the fiber reinforced plastic layer comprises a plurality of sheets of unidirectional fiber reinforcement bonded together by a thermoplastic resin.

24. A case for a rocket motor as defined in claim 12, wherein the metal shell includes a plurality of fin attachments positioned in axially extending rows.

25. A process for manufacturing a hybrid pressure vessel, comprising the steps of:

cutting, with a laser, a plurality of axially extending slots in a cylindrical, metal shell, each slot formed by a single, linear cut of the laser to produce slots having a width substantially equivalent to the cutting width of the laser, wherein the plurality of slots are positioned in axially extending rows, each slot having a length (L), wherein each row of slots is separated from an adjacent row of shots by a circumferential distance (c), the slots configured such that $L \geq 6C$; and attaching a fiber reinforced plastic layer to the shell.

26. A process for manufacturing a hybrid pressure vessel as defined in claim 25, wherein the step of cutting slots in the metal shell comprises initially cutting through the shell at a location corresponding to a center portion of a slot to form a keyhole and cutting axially outwardly from the keyhole to form the slot.

27. A process for manufacturing a hybrid pressure vessel as defined in claim 25, further comprising blocking any portion of the cutting beam which penetrates the metal shell, thereby preventing the beam from contacting any other portion of the metal shell.

28. A process for manufacturing a hybrid pressure vessel as defined in claim 27, wherein the blocking step comprises inserting a blocking material within the metal shell.

29. A process for manufacturing a hybrid pressure vessel as defined in claim 25, wherein the laser produces a cutting width of about 0.005 inches.

30. A process for manufacturing a hybrid pressure vessel as defined in claim 25, wherein the laser is a $CO_2$ laser.

31. A process for manufacturing a hybrid pressure vessel as defined in claim 25, wherein the metal shell is made of a high-strength steel, wherein each slot has two ends and further comprising the step of heating a portion of the metal shell to produce a tempered zone about the ends of each slot.

32. A process for manufacturing a hybrid pressure vessel as defined in claim 31, wherein the heating step comprises defocusing the laser beam and using the laser beam to heat the portion of the metal shell corresponding to the tempered zone for a predetermined period of time.

33. A process for manufacturing a hybrid pressure vessel as defined in claim 31, wherein the tempered zone extends outwardly from each slot end a distance of approximately five percent of the circumferential distance (C).

34. A process for manufacturing a hybrid pressure vessel as defined in claim 25, wherein at least two of the slots in the metal shell are collinearly positioned and separated by an axial distance (A) and wherein $L+A \geq 6C$ and $L \geq 4A$.

* * * * *

UNITED STATES PATENT AND TRADEMARK OFFICE
CERTIFICATE OF CORRECTION

PATENT NO. : 5,564,272
DATED : October 15, 1996
INVENTOR(S) : Mark J. Warner et al.

It is certified that error appears in the above-identified patent and that said Letters Patent is hereby corrected as shown below:

Column 1, after the title, insert

--ORIGIN OF THE INVENTION

This invention was made with government support under Contract No. N60530-91-C-0254 awarded by the Department of the Navy. The United States Government has certain rights in this invention.--

Signed and Sealed this

Ninth Day of June, 1998

*Attest:*

BRUCE LEHMAN

*Attesting Officer*     *Commissioner of Patents and Trademarks*